(12) United States Patent
Yu et al.

(10) Patent No.: US 12,316,244 B2
(45) Date of Patent: May 27, 2025

(54) THREE-LEVEL INVERTER, CONTROL METHOD, AND SYSTEM

(71) Applicant: HUAWEI DIGITAL POWER TECHNOLOGIES CO., LTD., Shenzhen (CN)

(72) Inventors: Xinyu Yu, Shanghai (CN); Fei Xu, Shanghai (CN); Kai Xin, Shanghai (CN); Zhiwu Xu, Shenzhen (CN); Lin Li, Shanghai (CN); Haibin Guo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 275 days.

(21) Appl. No.: 18/179,098

(22) Filed: Mar. 6, 2023

(65) Prior Publication Data

US 2023/0238896 A1 Jul. 27, 2023

Related U.S. Application Data

(63) Continuation of application No. PCT/CN2020/113953, filed on Sep. 8, 2020.

(51) Int. Cl.
*H02M 7/487* (2007.01)
*H02M 1/12* (2006.01)
*H02M 7/5387* (2007.01)

(52) U.S. Cl.
CPC ............ *H02M 7/487* (2013.01); *H02M 1/12* (2013.01); *H02M 7/53871* (2013.01)

(58) Field of Classification Search
CPC .... H02M 7/487; H02M 1/12; H02M 7/53871; H02M 1/0025; H02M 7/4833
See application file for complete search history.

(56) References Cited

U.S. PATENT DOCUMENTS

| 9,948,108 | B2 * | 4/2018 | Eren | ................. H02M 7/53875 |
| 2008/0298103 | A1 * | 12/2008 | Bendre | ................. H02M 7/487 363/97 |

(Continued)

FOREIGN PATENT DOCUMENTS

| CN | 104079197 A | 10/2014 |
| CN | 108880308 A | 11/2018 |

(Continued)

OTHER PUBLICATIONS

Extended European Search Report in European Appln No. 20952681.3, dated Aug. 28, 2023, 7 pages.

(Continued)

*Primary Examiner* — Yusef A Ahmed
(74) *Attorney, Agent, or Firm* — Fish & Richardson P.C.

(57) ABSTRACT

Example three-level inverters, control methods, and systems are provided. One example three-level inverter includes a first bus capacitor, a second bus capacitor, a power conversion circuit, and a controller. The first bus capacitor is connected in the middle of the current bus and the power conversion circuit. The power conversion circuit is configured to convert a direct current into a three-phase alternating current for output. The controller is configured to determine a balance reference by using a difference between absolute values of voltages of the positive and negative direct current buses and an even harmonic current in a grid-connected current, where the balance reference is used to enable the three-level inverter to generate a current signal for balancing the voltages of the positive and negative direct current buses.

13 Claims, 9 Drawing Sheets

(56) References Cited

U.S. PATENT DOCUMENTS

| | | | | |
|---|---|---|---|---|
| 2011/0127837 | A1* | 6/2011 | Sato | H02J 9/062 |
| | | | | 307/66 |
| 2011/0134672 | A1* | 6/2011 | Sato | H02M 1/10 |
| | | | | 363/126 |
| 2011/0141786 | A1* | 6/2011 | Shen | H02M 7/487 |
| | | | | 363/131 |
| 2012/0262957 | A1* | 10/2012 | Yamada | H02J 3/01 |
| | | | | 363/43 |
| 2012/0281442 | A1* | 11/2012 | Revelant | H02M 7/487 |
| | | | | 363/40 |
| 2013/0163292 | A1* | 6/2013 | Basic | H02M 5/4585 |
| | | | | 363/34 |
| 2013/0329471 | A1* | 12/2013 | Escobar | H02M 7/487 |
| | | | | 363/40 |
| 2019/0190276 | A1* | 6/2019 | Liu | H02J 3/46 |
| 2019/0280484 | A1* | 9/2019 | Shao | H02M 1/081 |
| 2020/0191846 | A1* | 6/2020 | Yin | G01R 27/2605 |
| 2020/0350847 | A1* | 11/2020 | Geyer | H02P 27/12 |
| 2021/0203248 | A1* | 7/2021 | Du | H02M 7/487 |
| 2021/0211066 | A1* | 7/2021 | Vavilpalli | H02J 3/48 |
| 2022/0037890 | A1* | 2/2022 | Yu | H02M 7/539 |
| 2022/0149751 | A1* | 5/2022 | Kojima | H02M 7/483 |
| 2022/0416685 | A1* | 12/2022 | Chen | H02M 7/483 |
| 2023/0038257 | A1* | 2/2023 | Ji | H02M 7/487 |
| 2023/0107678 | A1* | 4/2023 | Popek | H02M 1/08 |
| | | | | 363/44 |
| 2023/0223886 | A1* | 7/2023 | Abarzadeh | H02M 7/5395 |
| | | | | 318/504 |
| 2023/0318440 | A1* | 10/2023 | Yu | H02M 1/123 |
| | | | | 363/39 |
| 2023/0402941 | A1* | 12/2023 | Yu | H02M 7/5395 |
| 2024/0022181 | A1* | 1/2024 | Yu | H02M 1/14 |
| 2024/0039319 | A1* | 2/2024 | Liu | H02J 7/35 |
| 2024/0048068 | A1* | 2/2024 | Ning | H02J 9/00 |

FOREIGN PATENT DOCUMENTS

| | | |
|---|---|---|
| JP | H07135782 A | 5/1995 |
| JP | 2017060272 A | 3/2017 |

OTHER PUBLICATIONS

EP Communication Pursuant to Article 94(3) EPC in European Appln. No. 20952681.3, mailed on Aug. 27, 2024, 6 pages.

* cited by examiner

THREE-LEVEL INVERTER, CONTROL METHOD, AND SYSTEM

CROSS-REFERENCE TO RELATED APPLICATIONS

This application is a continuation of International Application No. PCT/CN2020/113953, filed on Sep. 8, 2020, the disclosure of which is hereby incorporated by reference in its entirety.

TECHNICAL FIELD

This application relates to the field of power electronics technologies, and in particular, to a three-level inverter, a control method, and a system.

BACKGROUND

Photovoltaic power generation is a technology for converting light energy into electrical energy by using photovoltaic effect of a semiconductor interface, and has developed rapidly. As a core component in a photovoltaic power generation system, a photovoltaic inverter is configured to convert a direct current generated by a photovoltaic module into an alternating current.

As a type of photovoltaic inverter, an inverter voltage of a three-level inverter is three levels, which is one more level than a two-level inverter. The three-level inverter is widely used because a volume of a passive device, for example, a filter inductor, can be effectively reduced. However, the three-level inverter has a bus neutral point, and a neutral-point potential balance of a bus is related to a plurality of indicators such as a withstand voltage of an inverter power device and harmonics of a grid-connected current. Therefore, control of the neutral-point potential balance of the three-level inverter is very important.

When the photovoltaic power generation system is applied to a grid-connected scenario, the photovoltaic power generation system is connected to a power grid, and there is large background harmonic voltage disturbance in the power grid. The background harmonic voltage causes a harmonic current to include current harmonics of a same frequency, resulting in voltage imbalance between positive and negative direct current buses. Consequently, a neutral point of a direct current bus deviates, which affects normal operation of an inverter.

SUMMARY

To resolve the foregoing technical problem, this application provides a three-level inverter, a control method, and a system. A balance between voltages of positive and negative direct current buses of the three-level inverter can be achieved.

According to a first aspect, this application provides a three-level inverter. The three-level inverter includes a first bus capacitor, a second bus capacitor, a power conversion circuit, and a controller. A first terminal of the first bus capacitor is connected to a positive direct current bus and a first input terminal of the power conversion circuit, a second terminal of the first bus capacitor is connected to a negative direct current bus and a second input terminal of the power conversion circuit through the second bus capacitor, and the second terminal of the first bus capacitor is further connected to a third input terminal of the power conversion circuit; the power conversion circuit is configured to convert a direct current into a three-phase alternating current for output; and the controller is configured to determine a balance reference by using a difference between absolute values of voltages of the positive and negative direct current buses and an even harmonic current in a grid-connected current, where the balance reference is used to enable the three-level inverter to generate a current signal for balancing the voltages of the positive and negative direct current buses.

The technical solution provided in this application takes into full consideration an impact of an even harmonic current in a grid-connected current on a neutral-point potential of a bus of a three-level inverter. The controller of the three-level inverter uses the difference between the absolute values of the voltages of the positive and negative direct current buses of the three-level inverter to indicate a deviation of a neutral-point potential of a bus at a current moment, determines the balance reference based on the even harmonic current in the grid-connected current, and adjusts the grid-connected current by using the current balance reference. To be specific, after the current signal generated according to the current balance reference is superimposed with the even harmonic current in the grid-connected current, the even harmonic current can be weakened. Therefore, a balance between the voltages of the positive and negative buses of the three-level inverter can be achieved, and harmonics of the grid-connected current are further suppressed, so that the adaptability of the three-level inverter to the power grid is improved, and the three-level inverter can strike a tradeoff between bus balance control and grid-connected harmonic current suppression in an adverse power grid environment.

With reference to the first aspect, in a first possible implementation, the controller determines a harmonic amplitude coefficient by using the difference; determines an order of the even harmonic current in the grid-connected current and a weight coefficient corresponding to each order of even harmonic current, where the weight coefficient is positively correlated with a degree of impact of the even harmonic current on the grid-connected current; and determines the balance reference based on the harmonic amplitude coefficient and the order and weight coefficient corresponding to each even harmonic current.

The balance reference combines the order with the weight coefficient that correspond to each even harmonic current, and can suppress the even harmonic current.

With reference to the first aspect, in a second possible implementation, the controller is specifically configured to: obtain a balance reference component corresponding to each even harmonic current, where the balance reference component is a product of the amplitude coefficient, the weight coefficient, and the order that are of the even harmonic current; and superimpose the balance reference component corresponding to each even harmonic current to obtain the balance reference.

With reference to the first aspect, in a third possible implementation, the controller is specifically configured to: superimpose the balance reference with the grid-connected current to obtain a grid-connected current reference; obtain a first balance voltage reference by using the grid-connected current reference; and adjust a drive reference of the three-level inverter by using the first balance voltage reference. To be specific, the obtained first balance voltage reference is superimposed with an original control signal of the three-level inverter to generate a drive signal for driving the three-level inverter, so that a current signal used to reduce the even harmonic current is generated in an output current of the three-level inverter.

With reference to the first aspect, in a fourth possible implementation, the controller superimposes the balance reference with the grid-connected current to obtain a grid-connected current reference; obtains a first balance voltage reference by using the grid-connected current reference; obtains a second balance voltage reference by using the difference; and adjusts a drive reference of the three-level inverter by using the first balance voltage reference and the second balance voltage reference, so that the current signal used to reduce the even harmonic current is generated in the output current of the three-level inverter.

The second balance voltage reference is a common mode voltage of the three-level inverter. The first balance voltage reference is superimposed with the second balance voltage reference, to generate a mix control reference of balance voltage and superimpose the obtained first balance voltage reference with the original control signal of the three-level inverter to generate the drive signal for driving the three-level inverter.

With reference to the first aspect, in a fifth possible implementation, a ratio of the weight coefficient corresponding to each even harmonic current is a ratio of an amplitude of each even harmonic current. That is, the weight coefficient is positively correlated with the amplitude. A higher amplitude indicates a larger corresponding even harmonic current and a higher degree of impact on the grid-connected current.

With reference to the first aspect, in a sixth possible implementation, the controller obtains the balance reference by using the difference when the even harmonic current in the grid-connected current is less than a preset current threshold, and/or when the difference is less than a preset voltage threshold.

When the even harmonic current in the grid-connected current is less than the preset current threshold, it indicates that in this case, the even harmonic current has a low degree of impact on the neutral-point potential of the bus that is negligible; or when the difference between the absolute values of the voltages of the positive and negative direct current buses is less than the preset voltage threshold, it indicates that in this case, the even harmonic current has a low degree of impact on the neutral-point potential of the bus. Therefore, if at least one of the foregoing two conditions is satisfied, it indicates that in this case, a condition of the power grid is good, and the even harmonic current in the grid-connected current has a small impact. Therefore, the balance reference may be obtained by using the difference. In this case, the balance reference is an amount of bus balance control for a three-phase common mode voltage.

With reference to the first aspect, in a seventh possible implementation, the controller is specifically configured to adjust the drive reference of the three-level inverter by using the balance reference.

With reference to the first aspect, in an eighth possible implementation, the current signal is opposite in phase to the even harmonic current, so that the even harmonic current in the grid-connected current is reduced as much as possible while the potential of the bus gains a balance.

According to a second aspect, this application further provides an inverter control method. The method includes: determining a balance reference by using a difference between absolute values of voltages of the positive and negative direct current buses of the three-level inverter and an even harmonic current in a grid-connected current, where the balance reference is used to enable the three-level inverter to generate a current signal for balancing the voltages of the positive and negative direct current buses; and adjusting the grid-connected current by using the balance reference.

In the method, the difference between the absolute values of the voltages of the positive and negative direct current buses of the three-level inverter is used to indicate a deviation of a neutral-point potential of a bus at a current moment, the balance reference is determined in combination with the even harmonic current in the grid-connected current, and the grid-connected current is adjusted by using the current balance reference signal, so that a current signal used to reduce the even harmonic current is generated in the grid-connected current. To be specific, after the current signal generated according to the current balance reference is superimposed with the even harmonic current in the grid-connected current, the even harmonic current can be weakened. Therefore, a balance between the voltages of the positive and negative buses of the three-level inverter is ensured. In addition, because in the method, the harmonics of the grid-connected current is suppressed, the adaptability of the three-level inverter to the power grid is further improved, and a probability of triggering protective shutdown of the three-level inverter due to imbalanced bus potentials in an adverse power grid environment is reduced.

With reference to the second aspect, in a first possible implementation, the determining a balance reference by using a difference between absolute values of voltages of the positive and negative direct current buses of the three-level inverter and an even harmonic current in a grid-connected current specifically includes: determining a harmonic amplitude coefficient by using the difference; determining an order of the even harmonic current in the grid-connected current and a weight coefficient corresponding to each order of even harmonic current, where the weight coefficient is positively correlated with a degree of impact of the even harmonic current on the grid-connected current; and determining the balance reference based on the harmonic amplitude coefficient and the order and weight coefficient corresponding to each even harmonic current.

With reference to the second aspect, in a second possible implementation, the determining the balance reference based on the harmonic amplitude coefficient and the order and weight coefficient corresponding to each even harmonic current specifically includes: obtaining a balance reference component corresponding to each even harmonic current, where the balance reference component is a product of the amplitude coefficient, the weight coefficient, and the order that are of the even harmonic current; and superimposing the balance reference component corresponding to each even harmonic current to obtain the balance reference.

With reference to the second aspect, in a third possible implementation, the adjusting the grid-connected current by using the balance reference specifically includes: superimposing the balance reference with the grid-connected current to obtain a grid-connected current reference; obtaining a first balance voltage reference by using the grid-connected current reference; and adjusting a drive reference of the three-level inverter by using the first balance voltage reference, so that a current signal used to reduce the even harmonic current is generated in an output current of the three-level inverter.

With reference to the second aspect, in a fourth possible implementation, the adjusting the grid-connected current by using the balance reference specifically includes: superimposing the balance reference with the grid-connected current to obtain a grid-connected current reference; obtaining a first balance voltage reference by using the grid-connected current reference; obtaining a second balance voltage reference by using the difference, where the second balance voltage reference is a common mode voltage of the three-level inverter; and adjusting a drive reference of the three-level inverter by using the first balance voltage reference and the second balance voltage reference, so that the current signal used to reduce the even harmonic current is generated in the output current of the three-level inverter.

With reference to the second aspect, in a fifth possible implementation, a ratio of the weight coefficient corresponding to each even harmonic current is a ratio of an amplitude of each even harmonic current.

With reference to the second aspect, in a sixth possible implementation, the determining a balance reference by using a difference between absolute values of voltages of the positive and negative direct current buses of the three-level inverter and an even harmonic current in a grid-connected current specifically includes: obtaining the balance reference by using the difference when the even harmonic current in the grid-connected current is less than a preset current threshold, and/or when the difference is less than a preset voltage threshold.

With reference to the second aspect, in a seventh possible implementation, the adjusting the grid-connected current by using the balance reference specifically includes: adjusting the drive reference of the three-level inverter by using the balance reference.

With reference to the second aspect, in an eighth possible implementation, the current signal is opposite in phase to the even harmonic current.

According to a third aspect, this application further provides an inverter control apparatus. The apparatus includes a determining unit and an adjustment unit. The determining unit is configured to determine a balance reference by using a difference between absolute values of voltages of the positive and negative direct current buses of the three-level inverter and an even harmonic current in a grid-connected current, where the balance reference is used to enable the three-level inverter to generate a current signal for balancing the voltages of the positive and negative direct current buses. The adjustment unit is configured to adjust the grid-connected current by using the balance reference.

With reference to the third aspect, in a first possible implementation, the determining unit specifically includes a first coefficient determining subunit, a second coefficient determining subunit, and a first reference determining subunit. The first coefficient determining subunit is configured to determine a harmonic amplitude coefficient by using the difference. The second coefficient determining subunit is configured to determine an order of the even harmonic current in the grid-connected current and a weight coefficient corresponding to each order of even harmonic current, where the weight coefficient is positively correlated with a degree of impact of the even harmonic current on the grid-connected current. The first reference determining subunit is configured to determine the balance reference based on the harmonic amplitude coefficient and the order and weight coefficient corresponding to each even harmonic current.

With reference to the third aspect, in a second possible implementation, the first reference determining subunit is specifically configured to: obtain a balance reference component corresponding to each even harmonic current, where the balance reference component is a product of the amplitude coefficient, the weight coefficient, and the order that are of the even harmonic current; and superimpose the balance reference component corresponding to each even harmonic current to obtain the balance reference.

With reference to the third aspect, in a third possible implementation, the adjustment unit is specifically configured to: superimpose the balance reference with the grid-connected current to obtain a grid-connected current reference; obtain a first balance voltage reference by using the grid-connected current reference; and adjust a drive reference of the three-level inverter by using the first balance voltage reference, so that a current signal used to reduce the even harmonic current is generated in an output current of the three-level inverter.

With reference to the third aspect, in a fourth possible implementation, the adjustment unit is specifically configured to: superimpose the balance reference with the grid-connected current to obtain a grid-connected current reference; obtain a first balance voltage reference by using the grid-connected current reference; obtain a second balance voltage reference by using the difference; and adjust a drive reference of the three-level inverter by using the first balance voltage reference and the second balance voltage reference, so that the current signal used to reduce the even harmonic current is generated in the output current of the three-level inverter.

With reference to the third aspect, in a fifth possible implementation, a ratio of the weight coefficient corresponding to each even harmonic current is a ratio of an amplitude of each even harmonic current.

With reference to the third aspect, in a sixth possible implementation, the determining unit is specifically configured to obtain the balance reference by using the difference when the even harmonic current in the grid-connected current is less than a preset current threshold, and/or when the difference is less than a preset voltage threshold.

With reference to the third aspect, in a seventh possible implementation, the adjustment unit is specifically configured to adjust the drive reference of the three-level inverter by using the balance reference.

With reference to the third aspect, in an eighth possible implementation, the current signal is opposite in phase to the even harmonic current.

According to a fourth aspect, this application further provides a photovoltaic power generation system. The photovoltaic power generation system includes the three-level inverter provided in any one of the foregoing implementations, and further includes a photovoltaic unit. The photovoltaic unit includes a plurality of photovoltaic modules, and an output terminal of the photovoltaic unit is connected to an input terminal of the three-level inverter. The photovoltaic unit is configured to convert light energy into a direct current and then transmit the direct current to the three-level inverter.

According to a fifth aspect, this application further provides a computer-readable storage medium. The storage medium stores a computer program, and when the computer program is executed, the control method provided in any one of the foregoing implementations is implemented.

DESCRIPTION OF EMBODIMENTS

To make a person skilled in the art more clearly understand technical solutions provided in embodiments of this application, an application scenario of the technical solutions provided in this application is first described below.

Figure 1:
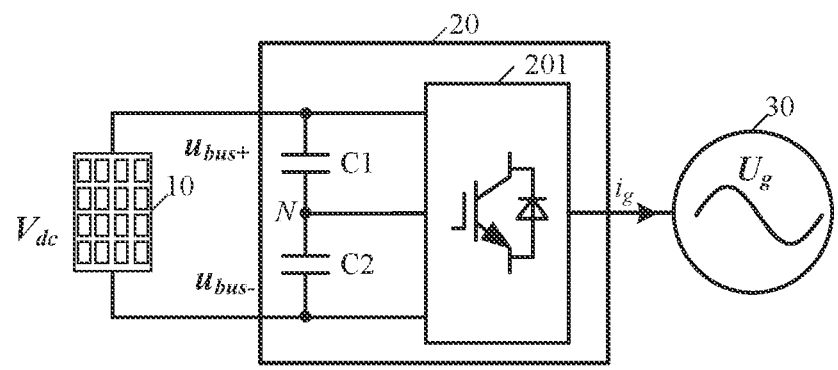
FIG. 1 is a schematic diagram of a photovoltaic system.

FIG. 1 is a schematic diagram of a photovoltaic system.

The photovoltaic system shown in the figure includes a photovoltaic unit 10 and a three-level inverter 20, and the photovoltaic system is connected to a power grid 30.

The photovoltaic unit 10 includes a plurality of photovoltaic (PV) modules. The plurality of photovoltaic modules are connected in series or in parallel. For example, the plurality of photovoltaic modules may first be connected in series to form a photovoltaic string, and then a plurality of photovoltaic strings are connected in series to form the photovoltaic unit 10.

The three-level inverter 20 is configured to convert a direct current generated by the photovoltaic unit 10 into an alternating current and then transmit the alternating current to the power grid. An output current of the photovoltaic system is represented by ig, and a voltage of the power grid is represented by Ug.

The three-level inverter 20 includes bus capacitors C1 and C2, and a power conversion circuit 201.

A neutral point of positive and negative direct current buses is represented by N. A potential balance of the neutral point N is related to a plurality of indicators such as a withstand voltage of a three-level inverter power device and harmonics of a grid-connected current. Therefore, control of the neutral-point potential balance of the three-level inverter is very important.

In order to achieve a neutral-point potential balance, at present, a balanced voltage of a bus may be forcibly achieved by connecting an external resistive load to the bus capacitors C1 and C2 of the three-level inverter 20; or an external switch converter is connected to positive and negative direct current buses, and when voltages of the positive and negative direct current buses are imbalanced, the external switch converter is controlled to work to transfer energy of the positive and negative direct current buses, so as to achieve the neutral-point potential balance.

However, although the foregoing measures are taken, when a power grid environment is adverse, in actual application, a problem that a three-level inverter is disconnected from a power grid due to imbalanced neutral-point potentials of a bus still exists. This seriously affects normal and reliable operation of the three-level inverter.

To resolve the foregoing technical problem, this application provides a three-level inverter, a control method, and a system that take into full consideration an impact of an even harmonic current in a grid-connected current on a neutral-point potential of a bus of the three-level inverter. A balance reference is determined by using a difference between absolute values of voltages of positive and negative direct current buses of the three-level inverter and the even harmonic current in the grid-connected current, the grid-connected current is adjusted by using the balance reference, so that a current signal used to reduce the even harmonic current is generated in the grid-connected current, and an impact of the grid-connected current on the three-level inverter is reduced, thereby ensuring a balance between the voltages of the positive and negative direct current buses of the three-level inverter. In addition, harmonics of the grid-connected current is further suppressed, adaptability of the three-level inverter to a power grid is further improved, and a probability of triggering protective shutdown of the three-level inverter due to imbalanced bus potentials in an adverse power grid environment is reduced.

To make a person skilled in the art understand the solutions in this application more clearly, the technical solutions in the embodiments of this application with reference to the accompanying drawings in the embodiments of this application are described below.

The terms such as "first" and "second" in the descriptions of this application are used only for the purpose of description and cannot be understood as indicating or implying relative importance or implicitly indicating a quantity of technical features indicated.

In this application, unless otherwise clearly specified and limited, the term "connection" should be understood in a broad sense. For example, a "connection" may be a fixed connection, a detachable connection, or an integrated structure, may be a direct connection, or may be an indirect connection through an intermediary.

Embodiment 1

The inventor finds based on research and repeated experiments that, for a power grid in an adverse condition, because the voltage Ug of the power grid includes a large even harmonic current, the grid-connected current ig of the three-level inverter 20 also includes a specific amount of harmonic currents with a same frequency, and an even harmonic current causes mutual energy transfer between positive and negative direct current buses of the photovoltaic system, thereby causing voltage imbalance between the positive and negative direct current buses. For specific descriptions of the energy transfer, refer to Table 1.

TABLE 1

Correspondence of energy transfer between direct current buses caused by a harmonic current

| Harmonic current order | Periodically exchanged external+/− energy E (j) of power grid | Semi-periodically transferred energy E (j) between positive and negative direct current buses |
|---|---|---|
| $I_m^n \cos(-2\ wt + \Delta\theta)$ | $\int_{-\pi}^{\pi} U_m \cos wt\ I_m^n \cos(-2\ wt + \Delta\theta) = 0$ | $\left\| \int_{-\frac{\pi}{2}}^{\frac{\pi}{2}} U_m \cos wt\ I_m^n \cos(-2\ wt + \Delta\theta) \right\| > 0$ |
| $I_m^n \cos(4\ wt + \Delta\theta)$ | $\int_{-\pi}^{\pi} U_m \cos wt\ I_m^n \cos(4\ wt + \Delta\theta) = 0$ | $\left\| \int_{-\frac{\pi}{2}}^{\frac{\pi}{2}} U_m \cos wt\ I_m^n \cos(4\ wt + \Delta\theta) \right\| > 0$ |
| $I_m^n \cos(-8\ wt + \Delta\theta)$ | $\int_{-\pi}^{\pi} U_m \cos wt\ I_m^n \cos(-8\ wt + \Delta\theta) = 0$ | $\left\| \int_{-\frac{\pi}{2}}^{\frac{\pi}{2}} U_m \cos wt\ I_m^n \cos(-8\ wt + \Delta\theta) \right\| > 0$ |
| $I_m^n \cos(10\ wt + \Delta\theta)$ | $\int_{-\pi}^{\pi} U_m \cos wt\ I_m^n \cos(10\ wt + \Delta\theta) = 0$ | $\left\| \int_{-\frac{\pi}{2}}^{\frac{\pi}{2}} U_m \cos wt\ I_m^n \cos(10\ wt + \Delta\theta) \right\| > 0$ |
| $I_m^n \cos(n\ wt + \Delta\theta)$ | $\int_{-\pi}^{\pi} U_m \cos wt\ I_m^n \cos(n\ wt + \Delta\theta) = 0$ | $\left\| \int_{-\frac{\pi}{2}}^{\frac{\pi}{2}} U_m \cos wt\ I_m^n \cos(n\ wt + \Delta\theta) \right\| > 0$ |

A frequency of the even harmonic current is an even multiple, for example, 2, 4, or 8 times, of a frequency of the grid-connected current.

An existing neutral-point potential balance control policy is limited in a control capability. When the energy transfer between the positive and negative direct current buses that is caused by the even harmonic current becomes severe, the existing policy cannot restrain the problem. As a result, a neutral-point potential of a direct current bus deviates, which affects normal and reliable operation of the three-level inverter. In severe cases, three-level inverters shut down in batches for protection and are disconnected from the grid.

Therefore, an embodiment of this application provides a three-level inverter control method. Specific descriptions with reference to the accompanying drawings are provided below.

Figure 2:
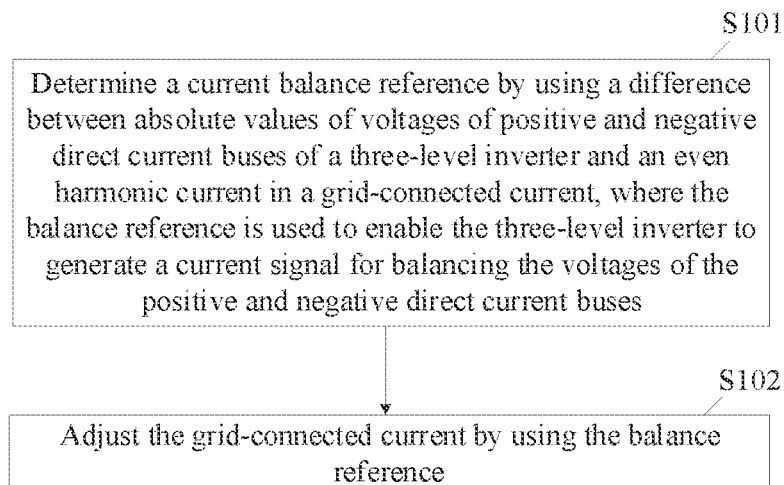
FIG. 2 is a flowchart of a three-level inverter control method according to an embodiment of this application.

FIG. 2 is a flowchart of a three-level inverter control method according to an embodiment of this application.

The method provided in this embodiment of this application may be implemented by a three-level inverter controller, and the method includes the following steps.

S101: Determine a balance reference by using a difference between absolute values of voltages of the positive and negative direct current buses of the three-level inverter and an even harmonic current in a grid-connected current, where the balance reference is used to enable the three-level inverter to generate a current signal for balancing the voltages of the positive and negative direct current buses.

In this case, the difference between the absolute values of the voltages of the positive and negative direct current buses of the three-level inverter indicates a degree of deviation of a neutral-point potential of a direct current bus at a current moment, and further indicates an impact of the even harmonic current in the grid-connected current on the neutral-point potential of the direct current bus at the current moment. An example is provided below for description.

It is assumed that at a moment, a total voltage of the direct current buses of a photovoltaic power generation system is 749.6 V. With the influence of the grid-connected current, the voltage of the positive direct current bus is +353.6 V, and the voltage of the negative direct current bus is −396 V. In this case, the difference is −42.4 V. A larger difference indicates a larger deviation of the voltages of the positive and negative direct current buses at a current moment, that is, the even harmonic current in the grid-connected current has a more serious impact on neutral point voltages of the positive and negative direct current buses.

In addition, the grid-connected current may be further sampled in real time, and harmonic information about the grid-connected current may be analyzed to obtain information about the even harmonic current in the grid-connected current. For example, amplitude information and order information of the even harmonic current are obtained. An order of the even harmonic current indicates a multiple relationship between a frequency of the even harmonic current and a frequency of the grid-connected current. Correspondingly, a greater order indicates a greater frequency of the harmonic current.

The balance reference is determined based on the difference and the even harmonic current in the grid-connected current. The balance reference is used to enable the three-level inverter to generate, in the grid-connected current, the current signal used to reduce the even harmonic current, that is, the generated current signal weakens the impact of the even harmonic current on the neutral point voltages of the positive and negative direct current buses of the three-level inverter.

S102: Adjust the grid-connected current by using the balance reference.

The balance reference obtained in S101 is used to control an operating status of the three-level inverter, so that a voltage balance between the positive and negative direct current buses of the three-level inverter can be achieved. By controlling the three-level inverter, an output current of the three-level inverter is adjusted, that is, the grid-connected current is adjusted.

In conclusion, the control method provided in this application takes into full consideration an impact of an even harmonic current in a grid-connected current on a neutral-point potential of a bus of a three-level inverter. The difference between the absolute values of the voltages of the positive and negative direct current buses of the three-level inverter is used to indicate a deviation of a neutral-point potential of a direct current bus at a current moment, the balance reference is determined in combination with the even harmonic current in the grid-connected current, and the grid-connected current is adjusted by using the current balance reference signal, so that a current signal used to reduce the even harmonic current is generated in the grid-connected current. To be specific, after the current signal generated according to the current balance reference is superimposed with the even harmonic current in the grid-connected current, the even harmonic current can be weakened. Therefore, a balance between the voltages of the positive and negative buses of the three-level inverter is ensured. In addition, because in the method, the harmonics of the grid-connected current is suppressed, the adaptability of the three-level inverter to the power grid is further improved, and a probability of triggering shutdown of the three-level inverter due to imbalanced bus potentials in an adverse power grid environment is reduced. This brings more friendliness to grid-connection, and shows more support to the power grid in addition to higher adaptability to the power grid.

Embodiment 2

A principle of controlling a three-level inverter to achieve a bus voltage balance is described below with reference to a specific implementation.

Figure 3:
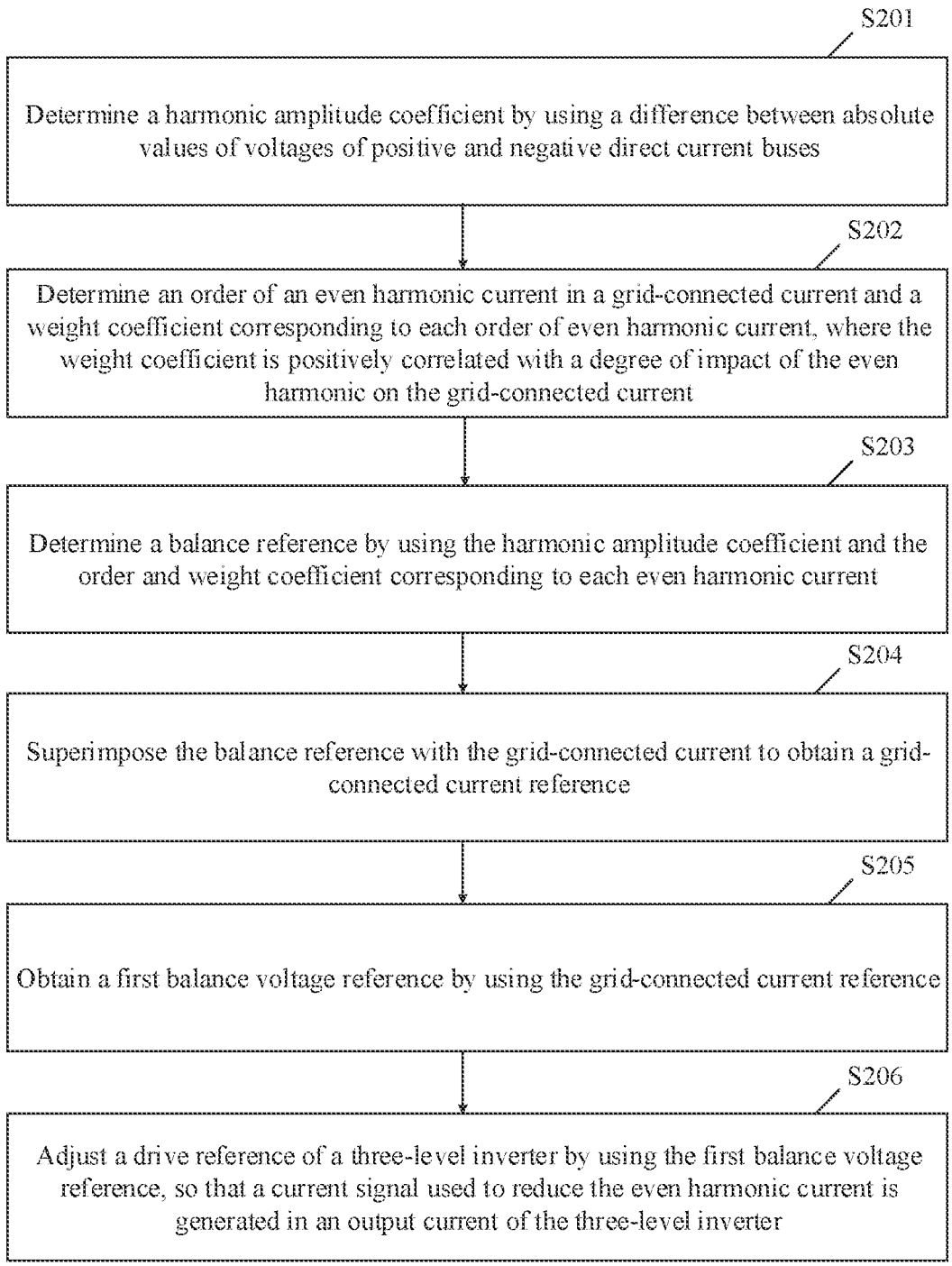
FIG. 3 is a flowchart of another three-level inverter control method according to an embodiment of this application.

FIG. 3 is a flowchart of another three-level inverter control method according to an embodiment of this application.

Figure 4:
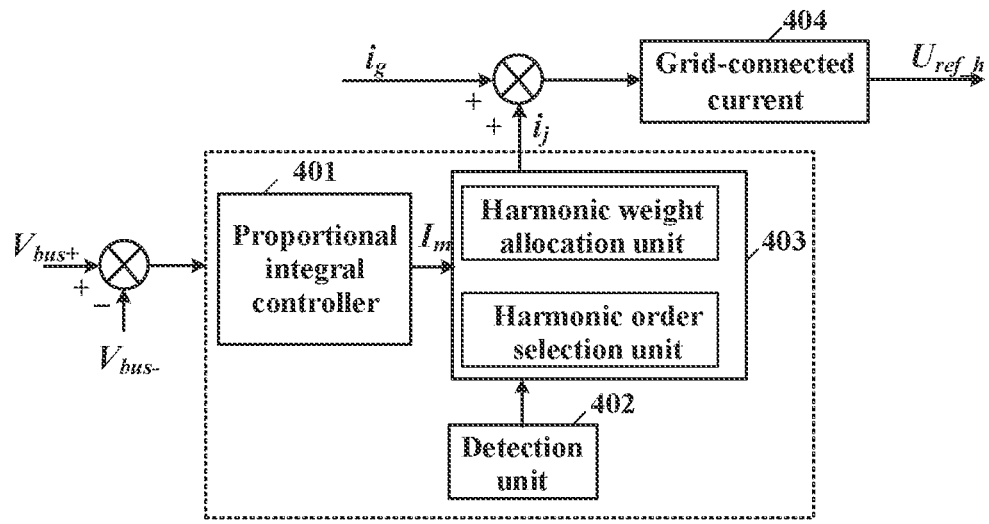
FIG. 4 is a block diagram of control according to an embodiment of this application.

For ease of understanding, reference may also be made to the block diagram of control shown in FIG. 4.

S201: Determine a harmonic amplitude coefficient by using the difference between the absolute values of the voltages of the positive and negative direct current buses.

After the three-level inverter is connected to the power grid, the voltages of the positive and negative direct current buses are collected in real time, and the difference $\Delta U$ between the absolute values of the voltages is obtained. A harmonic amplitude coefficient Im may be generated by a proportional integral controller (PI controller) 401 based on the deviation $\Delta U$. The harmonic amplitude coefficient indicates an amplitude of the even harmonic current in the grid-connected current at a current moment.

S202: Determine an order of the even harmonic current in the grid-connected current and a weight coefficient corresponding to each order of even harmonic current, where the weight coefficient is positively correlated with a degree of impact of the even harmonic current on the grid-connected current.

A detection unit 402 samples the grid-connected current ig, and a processing unit 403 analyzes sampling information about the grid-connected current, to obtain the order of the even harmonic current in the grid-connected current and the weight coefficient corresponding to each order of even harmonic current. Specifically, a harmonic order selection unit determines the order of each even harmonic current based on distribution of each order of harmonic in the grid-connected current:

$$\cos(nwt+\Delta\theta_n) \tag{1}$$

w is a fundamental angular frequency, $\Delta\theta_n$ is a harmonic order start phase angle, and n=2·i, i∈[−N, N], where N is a positive integer.

A harmonic weight allocation unit determines the weight coefficient $k_n$ corresponding to each order of even harmonic current. The weight coefficient is positively correlated with the degree of impact of the even harmonic current on the grid-connected current. A specific manner of allocating the weight coefficient is not specifically limited in this application.

In some embodiments, a ratio of the weight coefficient corresponding to each even harmonic current is a ratio of an amplitude of each even harmonic current. That is, the weight coefficient is positively correlated with the amplitude. A higher amplitude indicates a larger corresponding even harmonic current and a higher degree of impact on the grid-connected current. Therefore, a weight coefficient of a second-order harmonic current is the largest. In actual application, an order of the even harmonic current that needs to be considered may be determined based on a specific requirement of the three-level inverter, in normal operation, on a potential of the positive and negative direct current buses. For an even harmonic current of a very high order, because a weight coefficient of the even harmonic current is very small, the impact on the grid-connected current is negligible.

S203: Determine the balance reference based on the harmonic amplitude coefficient and the order and weight coefficient corresponding to each even harmonic current.

The balance reference is combined with the order and weight coefficient corresponding to each even harmonic current, and is used to generate a current signal used to reduce the even harmonic current in an output current of the three-level inverter. That is, the balance reference is used to suppress the even harmonic current.

A method for determining the balance reference is described below.

Figure 5:
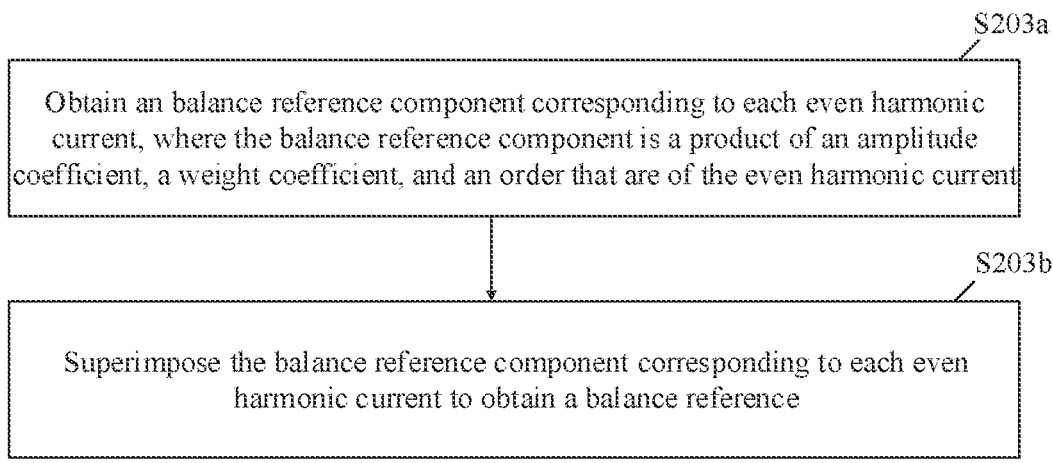
FIG. 5 is a flowchart of a method for determining a balance reference according to an embodiment of this application.

FIG. 5 is a flowchart of a method for determining the balance reference according to an embodiment of this application.

S203a: Obtain a balance reference component corresponding to each even harmonic current, where the balance reference component is a product of the amplitude coefficient, the weight coefficient, and the order that are of the even harmonic current.

The balance reference component is $i_{jcomponent}(t)$, as shown in the following formula:

$$i_{jcomponent}(t)=I_m \cdot k_n \cdot \cos(nwt+\Delta\theta_n) \tag{2}$$

$k_n \in [-1, 1]$.

S203b: Superimpose the balance reference component corresponding to each even harmonic current to obtain the balance reference.

The balance reference is (t), as shown in the following formula:

$$i_j(t)=I_m \cdot \Sigma_{n=-N}^{N} k_n \cdot \cos(nwt+\Delta\theta_n) \tag{3}$$

j=a, b, c. a, b, and c each correspond to one phase of a three-phase alternating current.

In some other embodiments, an even harmonic current whose weight coefficient is less than a preset weight threshold is negligible. A method for determining the preset weight threshold and a specific value of the preset weight threshold are not specifically limited in this application.

S204: Superimpose the balance reference with the grid-connected current to obtain a grid-connected current reference.

The grid-connected current reference $i_{ref}$ is shown in the following formula:

$$i_{ref}=i_g+i_j(t) \quad (4)$$

S205: Obtain a first balance voltage reference by using the grid-connected current reference.

To be specific, after the grid-connected current reference $i_{ref}$ passes through a grid-connected current loop 404, the first balance voltage reference $U_{ref\_h}$ is generated. The grid-connected current loop includes a loop for adjusting an operating status of the three-level inverter based on feedback of the sampling information about the grid-connected current. A principle of detection and control of the loop is a mature conventional technology, and details are not described herein in this embodiment of this application.

S206: Adjust a drive reference of the three-level inverter by using the first balance voltage reference, so that the current signal used to reduce the even harmonic current is generated in the output current of the three-level inverter.

The obtained $U_{ref\_h}$ is superimposed with an original control signal of the three-level inverter to generate a drive signal for driving the three-level inverter. The three-level inverter includes a controllable switch. A type of the controllable switch is not specifically limited in this embodiment of this application. For example, the controllable switch may be an insulated gate bipolar transistor (IGBT), a metal-oxide semiconductor field-effect transistor (MOSFET, MOS for short), a silicon carbide metal-oxide semiconductor field-effect transistor (SiC MOSFET), or the like.

When the method in this embodiment of this application is applied to a controller, the controller adjusts a pulse width modulation (PWM) signal used in the controllable switching transistor to adjust an operating status of the controllable switching transistor, so that the current signal used to reduce the even harmonic current is generated in the output current of the three-level inverter. Therefore, after the current signal is superimposed with the even harmonic current in the grid-connected current, the even harmonic current can be weakened.

In some embodiments, to better weaken the even harmonic current, the current signal generated from an output end of the three-level inverter is opposite in phase to the even harmonic current, so that the even harmonic current in the grid-connected current is reduced as much as possible while the potential of the bus gains a balance.

The division and sequence of the foregoing steps in the embodiments of this application are merely for convenience, and do not constitute a limitation on this application. A person skilled in the art may make proper adjustments in specific implementations. For example, a sequence of S201 and S202 may be interchanged.

In conclusion, by using the method in this embodiment of this application, a balance between the voltages of the positive and negative buses of the three-level inverter is ensured. In addition, because in the method, the harmonics of the grid-connected current is suppressed, the adaptability of the three-level inverter to the power grid is further improved, and a probability of triggering protective shutdown of the three-level inverter due to imbalanced bus potentials in an adverse power grid environment is reduced. To help a person skilled in the art clearly understand advantages of the solutions of this application, specific descriptions with reference to the accompanying drawings are provided below.

Figure 6:
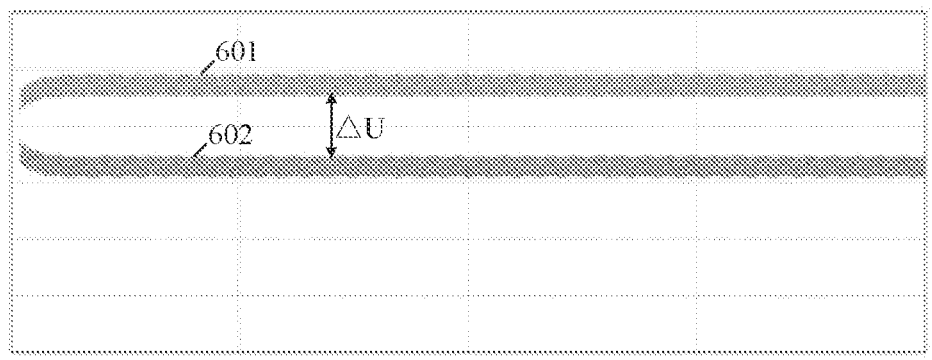
FIG. 6 is a waveform when a control method in this application is not used according to an embodiment of this application.
Figure 7:
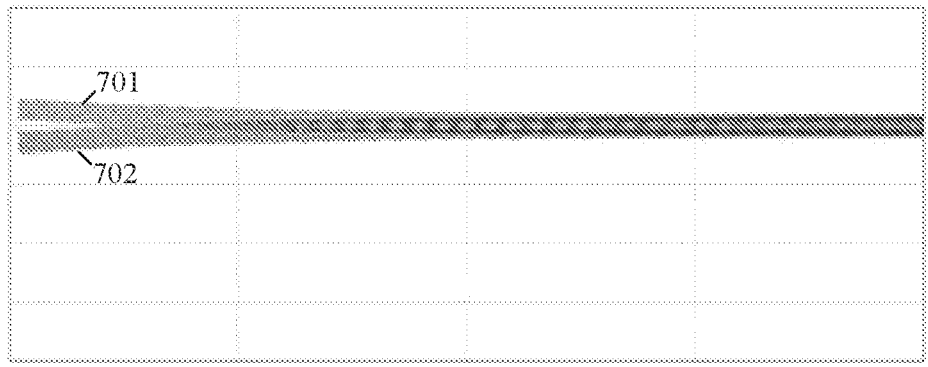
FIG. 7 is a waveform when a control method in this application is used according to an embodiment of this application.

Refer to FIG. 6 and FIG. 7. FIG. 6 is a waveform when a control method in this application is not used according to an embodiment of this application; and FIG. 7 is a waveform when a control method in this application is used according to an embodiment of this application.

In FIG. 6, a waveform of the voltage of the positive direct current bus is 602, and a waveform of the voltage of the negative direct current bus after the absolute value is used is 601. Due to the impact of the even harmonic component in the grid-connected current, energy is transferred between the positive and negative direct current buses. Therefore, there is an obvious voltage difference $\Delta U$ between the two waveforms.

After the control method in this application is used in FIG. 7, an effective neutral-point potential balance is gained, so that the voltages of the positive and negative direct current buses of the inverter are balanced.

Figure 8:
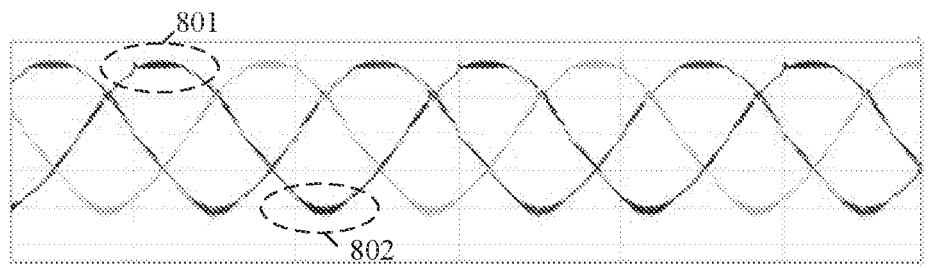
FIG. 8 is a waveform of a grid-connected current corresponding to FIG. 6 according to an embodiment of this application.
Figure 9:
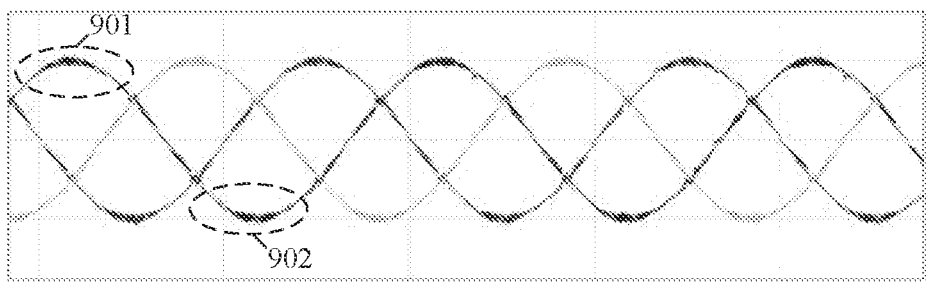
FIG. 9 is a waveform of a grid-connected current corresponding to FIG. 7 according to an embodiment of this application.

Refer to FIG. 8 and FIG. 9. FIG. 8 is a waveform of a grid-connected current corresponding to FIG. 6 according to this application; and FIG. 9 is a waveform of a grid-connected current corresponding to FIG. 7 according to this application.

A form of the grid-connected current is a three-phase alternating current. An area 801 in FIG. 8 is a wave crest of an one-phase alternating current in the three-phase alternating current, and an area 802 is a wave trough of the phase current. Because there is an obvious even harmonic component in the grid-connected current, energy is transferred between the positive and negative direct current buses, causing obvious distortion of waveforms of the wave crest and the wave trough.

However, it can be learned from an area 901 and an area 902 in FIG. 9 that, by using the method in this embodiment of this application, not only a neutral-point potential balance of a bus of the three-level inverter is achieved, but also the even harmonic current in the grid-connected currents is suppressed, so that the output grid-connected current is more up to standard.

Embodiment 3

A principle of controlling a three-level inverter to achieve a bus voltage balance is described below with reference to another specific implementation.

Figure 10:
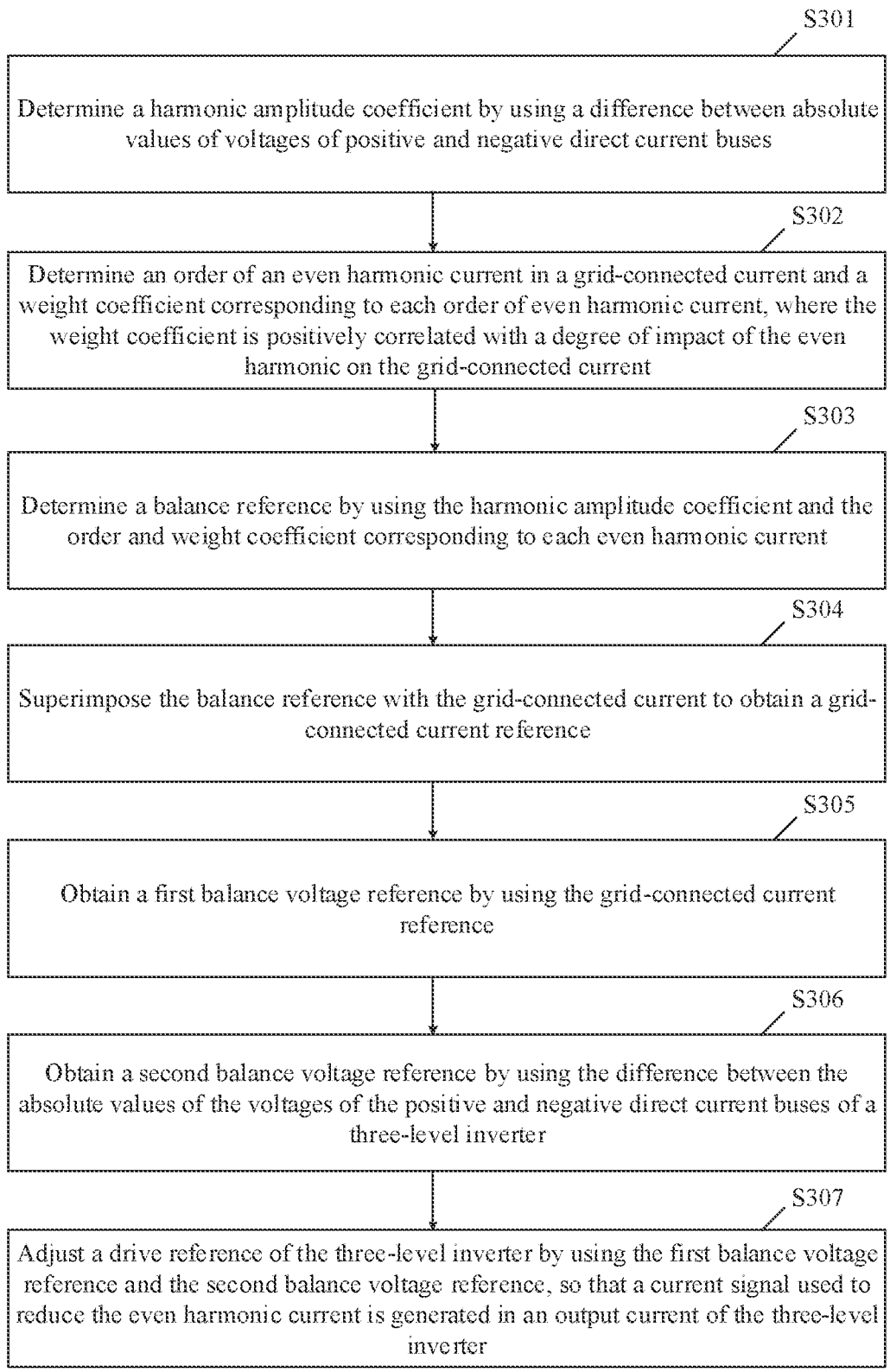
FIG. 10 is a flowchart of still another three-level inverter control method according to an embodiment of this application.

FIG. 10 is a flowchart of still another three-level inverter control method according to an embodiment of this application.

Figure 11:
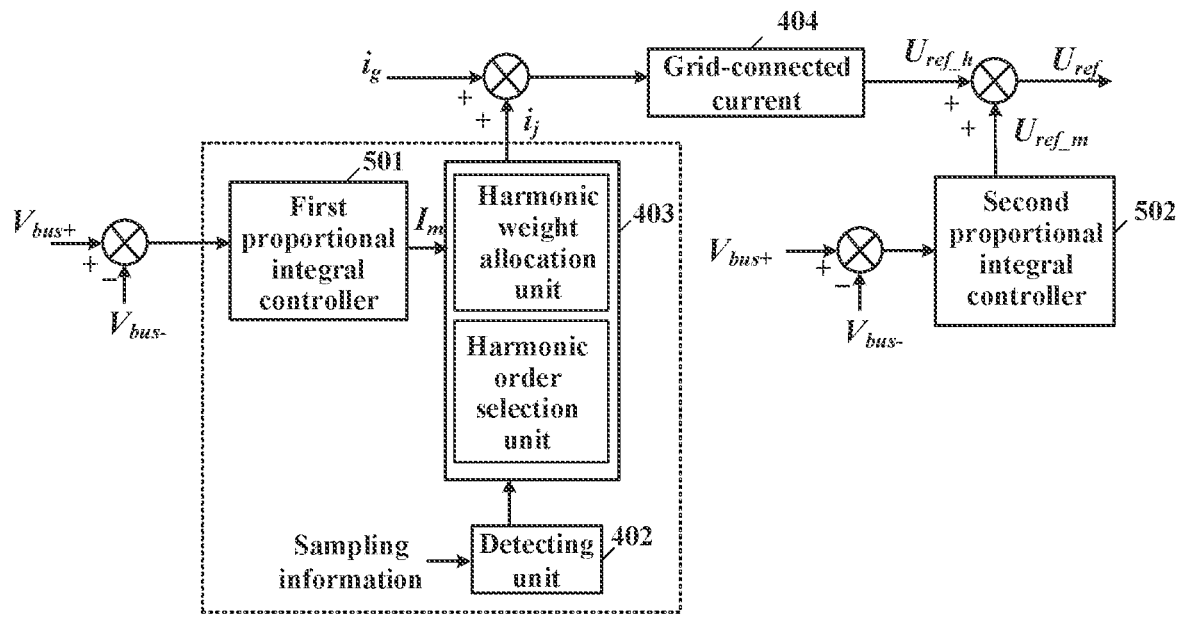
FIG. 11 is another block diagram of control according to an embodiment of this application.

For ease of understanding, refer to FIG. 11 that is another block diagram of control according to an embodiment of this application.

S301 to S305 of the method provided in this embodiment of this application correspond to S201 to S205 of the method in Embodiment 2. A difference lies only in that a first proportional integral controller in the embodiment of FIG. 11 is equivalent to the proportional integral controller 401 in FIG. 4. Details are not described in this embodiment of this application again.

The first balance voltage reference $U_{ref\_h}$ is obtained by performing S301 to S305.

S306: Obtain a second balance voltage reference by using the difference between the absolute values of the voltages of the positive and negative direct current buses of the three-level inverter.

The difference between the absolute values of the voltages of the positive and negative direct current buses of the three-level inverter is obtained, and the second balance voltage reference $U_{ref\_m}$ is generated by using the second proportional integral controller 502. The second balance voltage reference is a common mode voltage of the three-level inverter.

S307: Adjust a drive reference of the three-level inverter by using the first balance voltage reference and the second balance voltage reference, so that a current signal used to reduce the even harmonic current is generated in an output current of the three-level inverter.

The first balance voltage reference $U_{ref\_h}$ is superimposed with the second balance voltage reference $U_{ref\_m}$, to generate a mix control reference $U_{ref}$ of balance voltage and superimpose the obtained $U_{ref}$ with the original control signal of the three-level inverter to generate the drive signal for driving the three-level inverter.

The drive signal is used to drive the three-level inverter, so that the current signal used to reduce the even harmonic current is generated in the output current of the three-level inverter. In some embodiments, the drive signal may enable generation, in the output current of the three-level inverter, of the current signal that is opposite in phase to the even harmonic current, to reduce the even harmonic current in the grid-connected current as much as possible while the potential of the bus gains a balance.

Figure 12:
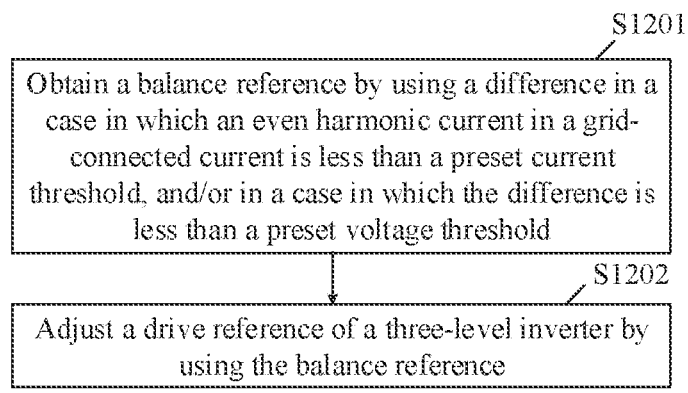
FIG. 12 is a flowchart of yet another three-level inverter control method according to an embodiment of this application.

FIG. 12 is a flowchart of yet another three-level inverter control method according to an embodiment of this application.

The method provided in this embodiment of this application includes the following steps.

S1201: Obtain the balance reference by using the difference when the even harmonic current in the grid-connected current is less than a preset current threshold, and/or when the difference is less than a preset voltage threshold.

When the even harmonic current in the grid-connected current is less than the preset current threshold, it indicates that in this case, the even harmonic current has a low degree of impact on the neutral-point potential of the bus that is negligible.

When the difference between the absolute values of the voltages of the positive and negative direct current buses is less than the preset voltage threshold, it indicates that in this case, the even harmonic current has a low degree of impact on the neutral-point potential of the bus.

Therefore, if at least one of the foregoing two conditions is satisfied, it indicates that in this case, a condition of the power grid is good, and the even harmonic current in the grid-connected current has a small impact. Therefore, the balance reference may be obtained by using the difference. In this case, the balance reference is an amount of bus balance control for a three-phase common mode voltage. A specific description is similar to that of the second balance voltage reference $U_{ref\_m}$ in the foregoing embodiment, the balance reference may be generated by the proportional integral controller.

S1202: Adjust the drive reference of the three-level inverter by using the balance reference.

The balance reference is superimposed with an original control signal of the three-level inverter to generate a drive signal for driving the three-level inverter.

In conclusion, by using the method provided in this embodiment of this application, when the even harmonic current in the grid-connected current impacts a neutral-point potential balance between the buses of the three-level inverter, the balance reference is determined by using the difference between the absolute values of the voltages of the positive and negative direct current buses of the three-level inverter in combination with the even harmonic current in the grid-connected current. The current balance reference is used to adjust the grid-connected current, thereby ensuring a balance between the voltages of the positive and negative buses of the three-level inverter. In addition, because in the method, the harmonics of the grid-connected current is suppressed, the adaptability of the three-level inverter to the power grid is further improved, and a probability of triggering protective shutdown of the three-level inverter due to imbalanced bus potentials in an adverse power grid environment is reduced.

Embodiment 4

Based on the three-level inverter control method provided in the foregoing embodiments, an embodiment of this application further provides a three-level inverter control apparatus. Specific descriptions with reference to the accompanying drawings are provided below.

Figure 13:
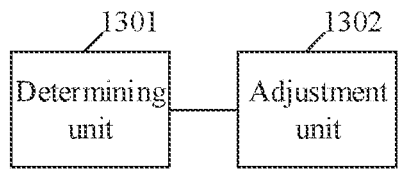
FIG. 13 is a schematic diagram of a three-level inverter control apparatus according to an embodiment of this application.

FIG. 13 is a schematic diagram of a three-level inverter control apparatus according to an embodiment of this application.

The apparatus includes a determining unit 1301 and an adjustment unit 1302.

The determining unit 1301 determines a balance reference by using a difference between absolute values of voltages of positive and negative direct current buses of a three-level inverter and an even harmonic current in a grid-connected current, where the balance reference is used to enable generation, in an output current of the three-level inverter, of a current signal used to reduce the even harmonic current.

In an implementation, the current signal is opposite in phase to the even harmonic current.

The adjustment unit 1302 is configured to adjust the grid-connected current by using the balance reference. That is, a grid-connected current loop 404 in FIG. 11 is included.

Figure 14:
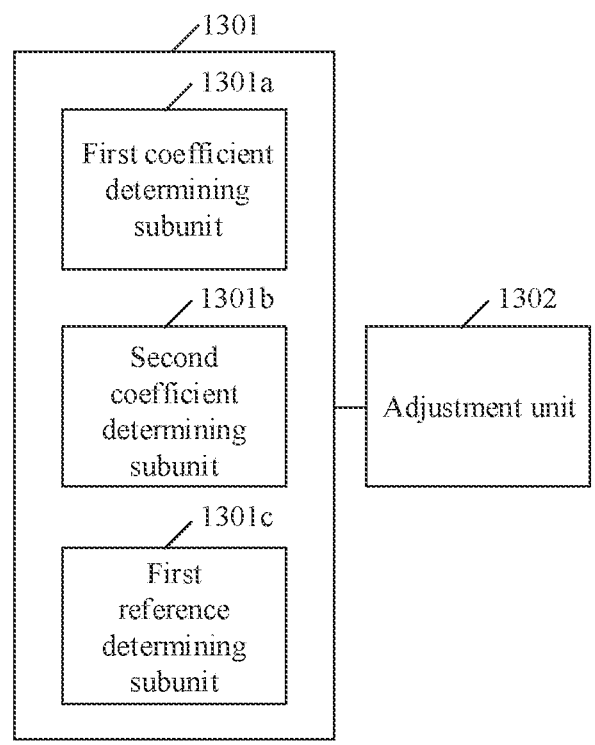
FIG. 14 is a schematic diagram of another three-level inverter control apparatus according to an embodiment of this application.

FIG. 14 is a schematic diagram of another three-level inverter control apparatus according to an embodiment of this application.

The determining unit 1301 specifically includes a first coefficient determining subunit 1301a, a second coefficient determining subunit 1301b, and a first reference determining subunit 1301c.

The first coefficient determining subunit 1301a is configured to determine a harmonic amplitude coefficient by using the difference. That is, a first proportional integral controller 501 shown in FIG. 11 is included.

The second coefficient determining subunit 1301b is configured to determine an order of the even harmonic current in the grid-connected current and a weight coefficient corresponding to each order of even harmonic current, where the weight coefficient is positively correlated with a degree of impact of the even harmonic current on the grid-connected current. That is, the detection unit 402 shown in FIG. 11, and the harmonic weight allocation unit and the harmonic order selection unit in 403 are included.

In some embodiments, a ratio of the weight coefficient corresponding to each even harmonic current is a ratio of an amplitude of each even harmonic current.

The first reference determining subunit 1301c is configured to determine the balance reference based on the harmonic amplitude coefficient and the order and weight coefficient corresponding to each even harmonic current.

Specifically, the first reference determining subunit 1301c obtains a balance reference component corresponding to each even harmonic current, where the balance reference component is a product of the amplitude coefficient, the weight coefficient, and the order that are of the even harmonic current; and superimposes the balance reference component corresponding to each even harmonic current to obtain the balance reference.

In some possible implementations, the adjustment unit 1302 superimposes the balance reference with the grid-connected current to obtain a grid-connected current reference; obtains a first balance voltage reference by using the grid-connected current reference; and adjusts a drive reference of the three-level inverter by using the first balance voltage reference, so that the current signal used to reduce the even harmonic current is generated in the output current of the three-level inverter. In this case, this implementation corresponds to the block diagram of control shown in FIG. 4.

In some other possible implementations, the adjustment unit 1302 superimposes the balance reference with the grid-connected current to obtain a grid-connected current reference, obtains a first balance voltage reference by using the grid-connected current reference, and obtains a second balance voltage reference by using the difference. The second balance voltage reference is an amount of bus balance control for a three-phase common mode voltage. A drive reference of the three-level inverter is adjusted by using the first balance voltage reference and the second balance voltage reference, so that the current signal used to reduce the even harmonic current is generated in the output current of the three-level inverter. To be specific, the adjustment unit 1302 further includes a second proportional integral controller 502 shown in FIG. 11, and this implementation corresponds to the block diagram of control shown in FIG. 11.

Still refer to FIG. 13. In another possible implementation, the determining unit 1301 obtains the balance reference by using the difference when the even harmonic current in the grid-connected current is less than a preset current threshold, and/or when the difference is less than a preset voltage threshold.

In this case, a condition of the power grid is good, and the even harmonic current in the grid-connected current has a small impact. The balance reference is an amount of bus balance control for a three-phase common mode voltage, similar to the second balance voltage reference $U_{ref\_m}$ in FIG. 11, and may be generated by the second proportional integral controller 502.

The adjustment unit 1302 adjusts the drive reference of the three-level inverter by using the balance reference. Specifically, the adjustment unit 1302 superimposes the balance reference with an original control signal of the three-level inverter to generate a drive signal for driving the three-level inverter.

In conclusion, the determining unit of the control apparatus uses the difference between the absolute values of the voltages of the positive and negative direct current buses of the three-level inverter to indicate a deviation of a neutral-point potential of a bus at a current moment, and determines the balance reference based on the even harmonic current in the grid-connected current. The adjustment unit adjusts the grid-connected current by using the current balance reference signal, so that a current signal used to reduce the even harmonic current is generated in the grid-connected current. To be specific, after the current signal generated according to the current balance reference is superimposed with the even harmonic current in the grid-connected current, the even harmonic current can be weakened. Therefore, a balance between the voltages of the positive and negative buses of the three-level inverter is ensured. In addition, the harmonics of the grid-connected current is further suppressed, the adaptability of the three-level inverter to the power grid is further improved, and a probability of shutdown of the three-level inverter due to imbalanced bus potentials in an adverse power grid environment is reduced.

Embodiment 5

Based on the three-level inverter control method provided in the foregoing embodiments, an embodiment of this application further provides a three-level inverter. Specific descriptions with reference to the accompanying drawings are provided below.

Figure 15:
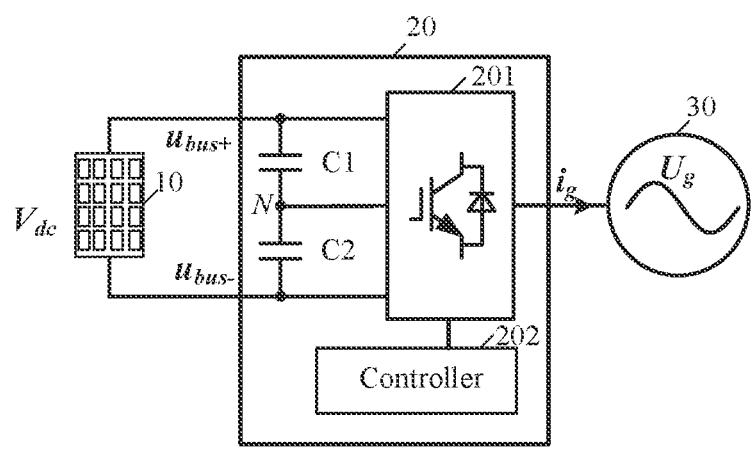
FIG. 15 is a schematic diagram of a three-level inverter according to an embodiment of this application.

FIG. 15 is a schematic diagram of a three-level inverter according to an embodiment of this application.

As shown in the figure, the three-level inverter 20 includes a first bus capacitor C1, a second bus capacitor C2, a power conversion circuit 201, and a controller 202.

A first terminal of the first bus capacitor C1 is connected to a positive direct current bus and a first input terminal of the power conversion circuit 201, a second terminal of the first bus capacitor C1 is connected to a negative direct current bus and a second input terminal of the power conversion circuit 201 through the second bus capacitor C2, and the second terminal of the first bus capacitor C1 is further connected to a third input terminal of the power conversion circuit 201.

The power conversion circuit 201 is configured to convert a direct current into a three-phase alternating current for output.

Figure 16:
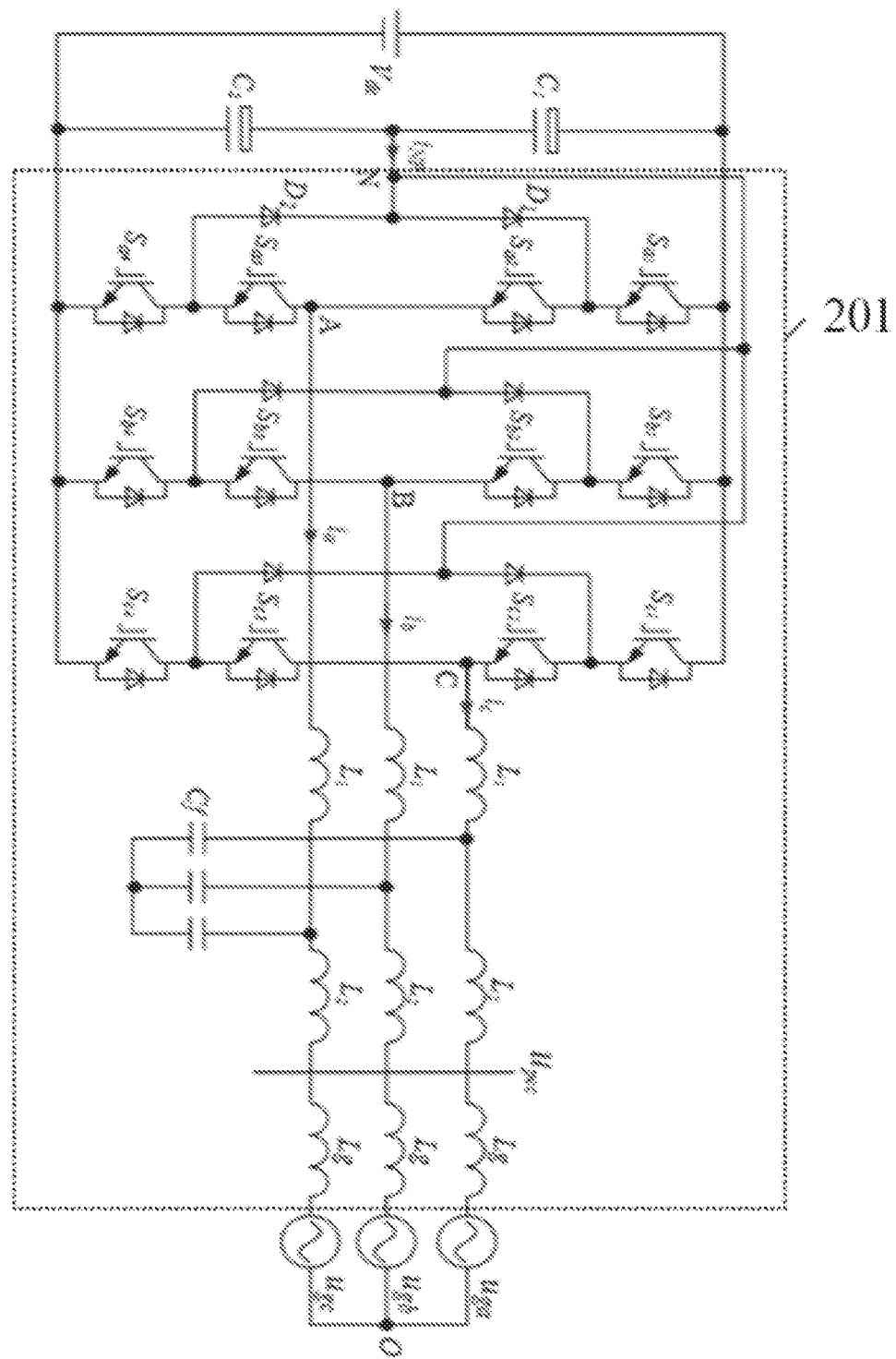
FIG. 16 is a schematic diagram of a power conversion circuit according to an embodiment of this application.

FIG. 16 is a schematic diagram of a power conversion circuit according to an embodiment of this application.

The figure shows a possible implementation of the power conversion circuit. An operating principle of the power conversion circuit is a mature conventional technology, and details are not described in this embodiment of this application.

The controller 202 is configured to: determine a balance reference by using a difference between absolute values of voltages of positive and negative direct current buses and an even harmonic current in a grid-connected current, where the balance reference is used to enable generation, in an output current of the three-level inverter, of a current signal used to reduce the even harmonic current; and adjust the grid-connected current by using the balance reference.

In an embodiment, the current signal is opposite in phase to the even harmonic current.

The controller 202 is specifically configured to: determine a harmonic amplitude coefficient by using a difference, determine an order of an even harmonic current in the grid-connected current, and determine a weight coefficient corresponding to each order of even harmonic current, where the weight coefficient is positively correlated with a degree of impact of the even harmonic current on the grid-connected current; and determine the balance reference based on the harmonic amplitude coefficient, and the order and the weight coefficient corresponding to each even harmonic current.

In a possible implementation, a ratio of the weight coefficient corresponding to each even harmonic current is a ratio of an amplitude of each even harmonic current.

Further, the controller 202 obtains a balance reference component corresponding to each even harmonic current, where the balance reference component is a product of the amplitude coefficient, the weight coefficient, and the order that are of the even harmonic current; and superimposes the balance reference component corresponding to each even harmonic current to obtain the balance reference.

In some embodiments, the controller superimposes the balance reference with the grid-connected current to obtain a grid-connected current reference; obtains a first balance voltage reference by using the grid-connected current reference; and adjusts a drive reference of the three-level inverter by using the first balance voltage reference, so that the current signal used to reduce the even harmonic current is generated in the output current of the three-level inverter.

In some other embodiments, the controller superimposes the balance reference with the grid-connected current to obtain a grid-connected current reference; obtains a first balance voltage reference by using the grid-connected current reference; obtains a second balance voltage reference by using the difference, where the second balance voltage reference is an amount of bus balance control for a three-phase common mode voltage; and adjusts a drive reference of the three-level inverter by using the first balance voltage reference and the second balance voltage reference, so that the current signal used to reduce the even harmonic current is generated in the output current of the three-level inverter.

The controller or the like in the embodiments of this application may be an application-specific integrated circuit (ASIC), a programmable logic device (PLD), a digital signal processor (DSP), or a combination thereof. The PLD may be a complex programmable logic device (CPLD), a field-programmable gate array (FPGA), a generic array logic (GAL), or any combination thereof. This is not specifically limited in this embodiment of this application.

In conclusion, the controller of the three-level inverter uses the difference between the absolute values of the voltages of the positive and negative direct current buses of the three-level inverter to indicate a deviation of a neutral-point potential of a bus at a current moment, determines the balance reference based on the even harmonic current in the grid-connected current, and adjusts the grid-connected current by using the current balance reference signal, so that the current signal used to reduce the even harmonic current is generated in the grid-connected current. To be specific, after the current signal generated according to the current balance reference is superimposed with the even harmonic current in the grid-connected current, the even harmonic current can be weakened. Therefore, a balance between the voltages of the positive and negative buses of the three-level inverter is ensured. In addition, as the harmonics of the grid-connected current is further suppressed, the adaptability of the three-level inverter to the power grid is further improved, and a probability of triggering protective shutdown of the three-level inverter due to imbalanced bus potentials in an adverse power grid environment is reduced.

Embodiment 6

Based on the three-level inverter provided in the foregoing embodiments, an embodiment of this application further provides a photovoltaic power generation system. Specific descriptions with reference to the accompanying drawings are provided below.

Figure 17:
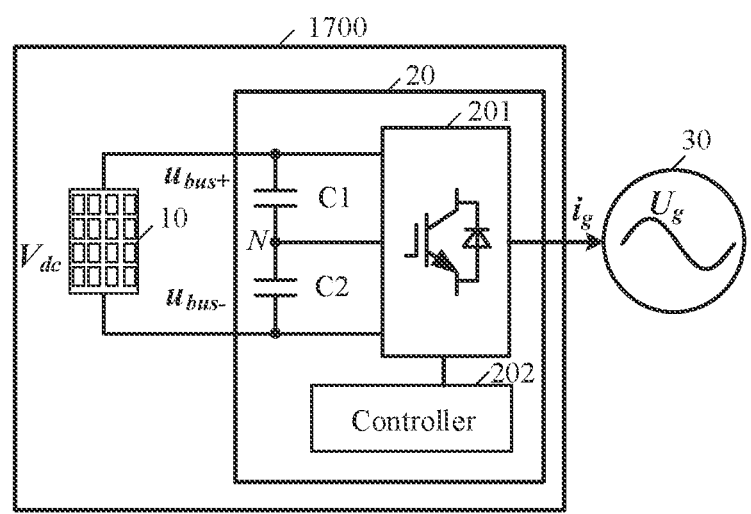
FIG. 17 is a schematic diagram of a photovoltaic power generation system according to an embodiment of this application.

FIG. 17 is a schematic diagram of a photovoltaic power generation system according to an embodiment of this application.

The photovoltaic power generation system 1700 includes a photovoltaic unit 10 and a three-level inverter 20.

The photovoltaic unit 10 includes a plurality of photovoltaic modules, and an output terminal of the photovoltaic unit 10 is connected to an input terminal of the three-level inverter 20.

The photovoltaic unit 10 is configured to convert light energy into a direct current and then transmit the direct current to the three-level inverter 20.

The three-level inverter 20 is configured to convert a direct current into a three-phase alternating current for output.

A controller 202 of the three-level inverter 20 is configured to: determine a balance reference by using a difference between absolute values of voltages of positive and negative direct current buses of the three-level inverter and an even harmonic current in a grid-connected current, where the balance reference is used to enable generation, in an output current of the three-level inverter, of a current signal used to reduce the even harmonic current; and adjust the grid-connected current by using the balance reference.

For a specific operating principle of the controller 202, refer to related descriptions in the foregoing embodiments. Details are not described herein again in this embodiment of this application.

In conclusion, the photovoltaic power generation system provided in this embodiment of this application includes the three-level inverter. The controller of the three-level inverter uses the difference between the absolute values of the voltages of the positive and negative direct current buses of the three-level inverter and the even harmonic current in the grid-connected current to determine the balance reference, and adjusts the grid-connected current by using the current balance reference signal, so that the current signal used to reduce the even harmonic current is generated in the grid-connected current. To be specific, after the current signal generated according to the current balance reference is superimposed with the even harmonic current in the grid-connected current, the even harmonic current can be weakened. Therefore, a balance between the voltages of the positive and negative buses of the three-level inverter is ensured. In addition, the harmonics of the grid-connected current is further suppressed, the adaptability of the three-level inverter to the power grid is further improved, and a probability of triggering protective shutdown of the three-level inverter due to imbalanced bus potentials in an adverse power grid environment is reduced, thereby improving stability of the photovoltaic power generation system.

From the foregoing descriptions of the implementations, a person skilled in the art may clearly understand that all or some of the steps of the method in the embodiments may be implemented by software in addition to a universal hardware platform. Based on such an understanding, the technical solutions of this application may be implemented in a form of a software product. The computer software product may be stored in a storage medium, for example, a read-only memory (ROM)/RAM, a magnetic disk, or an optical disc, and includes several program codes or instructions for enabling an electronic device (that may be a personal computer, a server, or a network communication device, for example, a router) to perform the methods described in the embodiments or some parts of the embodiments of this application.

The electronic device configured to implement the computer program product includes a processor and a memory. The processor may be one processor, or may include a plurality of processors. The memory may include a volatile memory, for example, a random-access memory (RAM); the memory may further include a non-volatile memory, for example, a read-only memory (ROM), a flash memory, a hard disk drive (HDD), or a solid-state drive (SSD). The memory may further include a combination of the foregoing types of memories. The memory may be one memory, or may include a plurality of memories. In a specific implementation, the memory stores a computer-readable instruction, and the computer-readable instruction includes a plurality of software units, for example, the determining unit and the adjustment unit in the foregoing embodiments. After executing each software unit, the processor may perform a corresponding operation according to an indication of each software unit. In this embodiment, an operation performed by one software unit is actually an operation performed by the processor according to an indication of the software unit. After executing the computer-readable instruction in the memory, the processor may perform, based on an indication of the computer-readable instruction, all operations that may be performed by a network device.

The embodiments in this specification are described all in a progressive manner. For same or similar parts in the embodiments, refer to these embodiments, and each embodiment focuses on a part that is different from other embodiments. Especially, apparatus embodiments and device embodiments are basically similar to the method embodiments, and therefore are described briefly. For related parts, refer to parts of descriptions in the method embodiments. The described device and apparatus embodiments are merely examples. The modules described as separate parts may or may not be physically separate, and parts displayed as modules may or may not be physical modules, may be located at one position, or may be distributed on a plurality of network units. All or some of the modules may be selected as actually required to achieve the objectives of the solutions of embodiments. A person of ordinary skill in the art may understand and implement the embodiments without creative efforts.

It should be understood that in this application, "at least one (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

The foregoing described embodiments are merely intended for describing the technical solutions of this application, but not for limiting this application. Although this application is described in detail with reference to the foregoing embodiments, a person of ordinary skill in the art should understand that modifications can still be made to the technical solutions described in the foregoing embodiments or equivalent replacements can still be made to some technical features thereof, without departing from the spirit and scope of the technical solutions of the embodiments of this application.

What is claimed is:

1. A three-level inverter, comprising a first bus capacitor, a second bus capacitor, a power conversion circuit, and a controller, wherein:
    a first terminal of the first bus capacitor is connected to a positive direct current bus and a first input terminal of the power conversion circuit, a second terminal of the first bus capacitor is connected to a negative direct current bus and a second input terminal of the power conversion circuit through the second bus capacitor, and the second terminal of the first bus capacitor is further connected to a third input terminal of the power conversion circuit;
    the power conversion circuit is configured to convert a direct current into a three-phase alternating current for output; and
    the controller is configured to:
        determine a balance reference by using a difference between absolute values of voltages of the positive and negative direct current buses and an even harmonic current in a grid-connected current, wherein the balance reference is used to enable the three-level inverter to generate a current signal for balancing the voltages of the positive and negative direct current buses, wherein determining the balance reference comprises:
            determining a harmonic amplitude coefficient by using the difference;
            determining an order of the even harmonic current in the grid-connected current and a weight coefficient corresponding to the order of the even harmonic current, wherein the weight coefficient is positively correlated with a degree of impact of the even harmonic current on the grid-connected current; and
            determining the balance reference based on a respective harmonic amplitude coefficient and a respective order and a respective weight coefficient corresponding to each even harmonic current;
        superimpose the balance reference with the grid-connected current to obtain a grid-connected current reference;
        obtain a first balance voltage reference by using the grid-connected current reference;
        obtain a second balance voltage reference by using the difference, wherein the second balance voltage reference is a common mode voltage of the three-level inverter; and
        adjust a drive reference of the three-level inverter by using the first balance voltage reference and the second balance voltage reference, wherein a current signal used to reduce the even harmonic current is generated in an output current of the three-level inverter.

2. The three-level inverter according to claim 1, wherein the controller is further configured to:
    obtain a balance reference component corresponding to each even harmonic current, wherein the balance reference component is a product of the harmonic amplitude coefficient, the weight coefficient, and the order that are of each even harmonic current; and
    superimpose the balance reference component corresponding to each even harmonic current to obtain the balance reference.

3. The three-level inverter according to claim 1, wherein a ratio of the weight coefficient corresponding to each even harmonic current is a ratio of an amplitude of each even harmonic current.

4. The three-level inverter according to claim 1, wherein the controller is further configured to:
    obtain the balance reference by using the difference when at least one of the following is satisfied:
        the even harmonic current in the grid-connected current is less than a preset current threshold; or
        the difference is less than a preset voltage threshold.

5. The three-level inverter according to claim 4, wherein the controller is further configured to:

adjust a drive reference of the three-level inverter by using the balance reference.

6. The three-level inverter according to claim 5, wherein the current signal is opposite in phase to the even harmonic current.

7. A three-level inverter control method, wherein the three-level inverter control method comprises:
   determining a balance reference by using a difference between absolute values of voltages of positive and negative direct current buses of a three-level inverter and an even harmonic current in a grid-connected current, wherein the balance reference is used to enable the three-level inverter to generate a current signal for balancing the voltages of the positive and negative direct current buses, wherein the three-level inverter comprises a first bus capacitor, a second bus capacitor, a power conversion circuit, and a controller, wherein the power conversion circuit is configured to convert a direct current into a three-phase alternating current for output, and wherein determining the balance reference comprises:
      determining a harmonic amplitude coefficient by using the difference;
      determining an order of the even harmonic current in the grid-connected current and a weight coefficient corresponding to the order of the even harmonic current, wherein the weight coefficient is positively correlated with a degree of impact of the even harmonic current on the grid-connected current; and
      determining the balance reference based on a respective harmonic amplitude coefficient and a respective order and a respective weight coefficient corresponding to each even harmonic current; and
   adjusting the grid-connected current by using the balance reference, wherein adjusting the grid-connected current by using the balance reference comprises:
      superimposing the balance reference with the grid-connected current to obtain a grid-connected current reference;
      obtaining a first balance voltage reference by using the grid-connected current reference;
      obtaining a second balance voltage reference by using the difference, wherein the second balance voltage reference is a common mode voltage of the three-level inverter; and
      adjusting a drive reference of the three-level inverter by using the first balance voltage reference and the second balance voltage reference, wherein a current signal used to reduce the even harmonic current is generated in an output current of the three-level inverter.

8. The three-level inverter control method according to claim 7, wherein determining the balance reference further comprises:
   obtaining a balance reference component corresponding to each even harmonic current, wherein the balance reference component is a product of the harmonic amplitude coefficient, the weight coefficient, and the order that are of each even harmonic current; and
   superimposing the balance reference component corresponding to each even harmonic current to obtain the balance reference.

9. The three-level inverter control method according to claim 7, wherein a ratio of the weight coefficient corresponding to each even harmonic current is a ratio of an amplitude of each even harmonic current.

10. The three-level inverter control method according to claim 7, wherein determining the balance reference further comprises:
    obtaining the balance reference by using the difference when at least one of the following is satisfied:
       the even harmonic current in the grid-connected current is less than a preset current threshold; or
       the difference is less than a preset voltage threshold.

11. The three-level inverter control method according to claim 10, wherein adjusting the grid-connected current by using the balance reference further comprises:
    adjusting a drive reference of the three-level inverter by using the balance reference.

12. The three-level inverter control method according to claim 7, wherein the current signal is opposite in phase to the even harmonic current.

13. A photovoltaic power generation system, wherein the photovoltaic power generation system comprises a three-level inverter and a photovoltaic unit, wherein:
    the photovoltaic unit comprises a plurality of photovoltaic modules, and an output terminal of the photovoltaic unit is connected to an input terminal of the three-level inverter;
    the photovoltaic unit is configured to convert light energy into a direct current and then transmit the direct current to the three-level inverter; and
    the three-level inverter comprises a first bus capacitor, a second bus capacitor, a power conversion circuit, and a controller, wherein:
       a first terminal of the first bus capacitor is connected to a positive direct current bus and a first input terminal of the power conversion circuit, a second terminal of the first bus capacitor is connected to a negative direct current bus and a second input terminal of the power conversion circuit through the second bus capacitor, and the second terminal of the first bus capacitor is further connected to a third input terminal of the power conversion circuit;
       the power conversion circuit is configured to convert a direct current into a three-phase alternating current for output; and
       the controller is configured to:
          determine a balance reference by using a difference between absolute values of voltages of the positive and negative direct current buses and an even harmonic current in a grid-connected current, wherein the balance reference is used to enable the three-level inverter to generate a current signal for balancing the voltages of the positive and negative direct current buses, wherein determining the balance reference comprises:
             determining a harmonic amplitude coefficient by using the difference;
             determining an order of the even harmonic current in the grid-connected current and a weight coefficient corresponding to the order of the even harmonic current, wherein the weight coefficient is positively correlated with a degree of impact of the even harmonic current on the grid-connected current; and
             determining the balance reference based on a respective harmonic amplitude coefficient and a respective order and a respective weight coefficient corresponding to each even harmonic current;

superimpose the balance reference with the grid-connected current to obtain a grid-connected current reference;

obtain a first balance voltage reference by using the grid-connected current reference;

obtain a second balance voltage reference by using the difference, wherein the second balance voltage reference is a common mode voltage of the three-level inverter; and adjust a drive reference of the three-level inverter by using the first balance voltage reference and the second balance voltage reference, wherein a current signal used to reduce the even harmonic current is generated in an output current of the three-level inverter.

* * * * *